(12) United States Patent
Jefferson, Sr.

(10) Patent No.: US 8,827,775 B2
(45) Date of Patent: Sep. 9, 2014

(54) DEVICE FOR REMOVING MATERIAL FROM FEET OF POULTRY

(76) Inventor: Wayne Allen Jefferson, Sr., Greenville, SC (US)

( * ) Notice: Subject to any disclaimer, the term of this patent is extended or adjusted under 35 U.S.C. 154(b) by 337 days.

(21) Appl. No.: 13/281,581

(22) Filed: Oct. 26, 2011

(65) Prior Publication Data

US 2013/0109286 A1    May 2, 2013

(51) Int. Cl.
*A22B 7/00* (2006.01)
*A22C 21/00* (2006.01)

(52) U.S. Cl.
CPC .................................. *A22C 21/0061* (2013.01)
USPC ........................................................ 452/173

(58) Field of Classification Search
USPC .............. 452/173, 81, 114, 120, 123
See application file for complete search history.

(56) References Cited

U.S. PATENT DOCUMENTS

| | | | | |
|---|---|---|---|---|
| 3,696,464 | A * | 10/1972 | Dillon et al. | 452/167 |
| 5,484,332 | A | 1/1996 | Leech et al. | |
| 5,514,033 | A * | 5/1996 | Berry | 452/182 |
| 5,863,244 | A | 1/1999 | Mansfield et al. | |
| 5,882,253 | A | 3/1999 | Mostoller | |
| 5,980,375 | A | 11/1999 | Anderson et al. | |
| 6,254,472 | B1 * | 7/2001 | Meyn | 452/188 |
| 6,283,848 | B1 * | 9/2001 | Berry | 452/166 |
| 6,733,379 | B2 * | 5/2004 | Tsang | 452/173 |
| 7,077,738 | B2 * | 7/2006 | Benson et al. | 452/149 |
| 7,226,349 | B2 | 6/2007 | Berry | |
| 7,378,642 | B2 * | 5/2008 | Jones | 250/223 R |
| 8,066,556 | B2 * | 11/2011 | Kjeldsen et al. | 452/76 |
| 8,202,143 | B1 * | 6/2012 | Taylor | 452/166 |
| 2005/0221750 | A1 | 10/2005 | Austin | |
| 2008/0125024 | A1 | 5/2008 | Berry | |
| 2010/0151779 | A1 | 6/2010 | Bakker | |
| 2010/0297923 | A1 | 11/2010 | Brown | |

FOREIGN PATENT DOCUMENTS

GB           1268593          3/1972

OTHER PUBLICATIONS

Spraying Systems Co., "Spray Products for the Car Wash Industry," brochure, Copyright 2008.
Spraying Systems Co., "Windjet Aire Products Catalog 20D," brochure, Copyright 2008.
International Search Report and Mitten Opinion for PCT/US2012/062279 dated Apr. 11, 2013.

* cited by examiner

*Primary Examiner* — Richard Price, Jr.
(74) *Attorney, Agent, or Firm* — J. Bennett Mullinax, LLC

(57) ABSTRACT

A device is disclosed for removing lesion material from poultry feet including a frame defining an input zone, a cleaning zone, and an output zone. A conveyor moves poultry feet sequentially through the input zone, the cleaning zone, and the output zone, the conveyor configured for holding the poultry feet in a cleaning position. At least one spray head is located in the cleaning zone for spraying the poultry feet while held by the conveyor in the cleaning position to remove the lesion material.

17 Claims, 9 Drawing Sheets

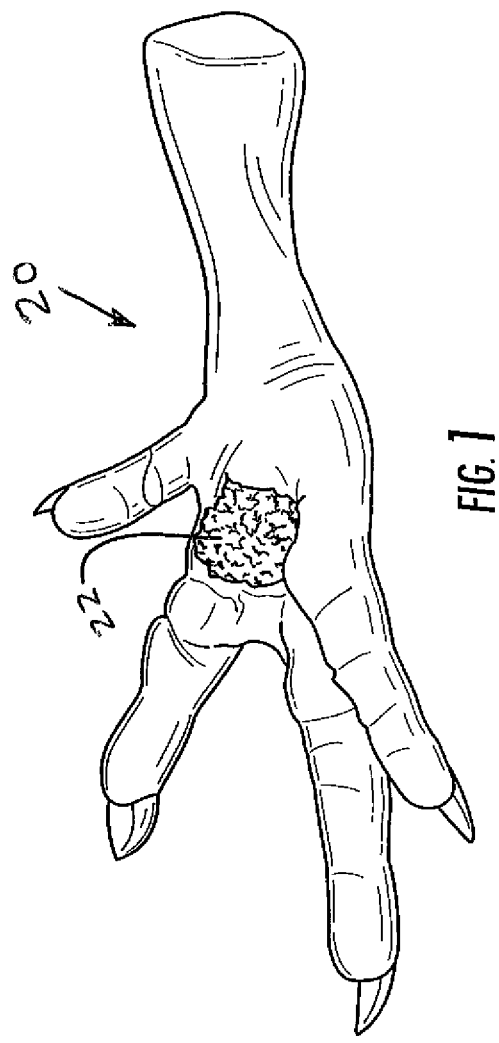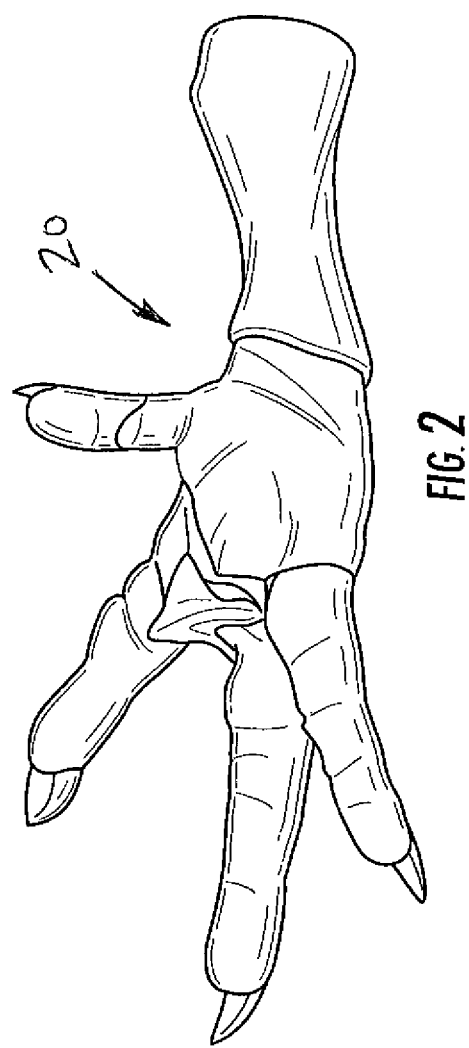

DEVICE FOR REMOVING MATERIAL FROM FEET OF POULTRY

FIELD OF THE INVENTION

The subject matter disclosed herein relates to devices for removing material from the feet of poultry.

BACKGROUND OF THE INVENTION

The demand for poultry, and especially chicken feet (sometimes called paws) as a specialty food item, particularly in Asia, is relatively great. After paws are removed from chickens during processing, the paws are graded according to various quality factors. The value of a paw varies greatly depending on the grade.

There are three principal grades: condemned grade, sub-grade, and A-grade. Condemned grade paws are used primarily as a component in animal feeds. Sub-grade and A-grade paws are used principally for human consumption. An A-grade paw may be worth in the range of ten times that of a condemned paw, and several times a sub-grade paw. Therefore, it would be commercially advantageous to minimize the number of paws that are classed as condemned grade and to maximize the number of paws that are classed as A-grade.

Typically, sorting of paws by grade is done by hand upon visual inspection, separating paws from one stream into three. This can be a time consuming exercise, and often results in many paws being graded condemned or sub-grade.

One of the principal factors causing a paw to be graded below A-grade is the presence and size of dark sores or lesions on the paw, for example on the metatarsal pad. These sores (also sometimes called blisters) often are urea/ammonia burns that arise from contact between the chicken and chicken feces present on the floor where the chicken is kept. FIG. 1 shows a paw 20 with a large lesion 22 on a bottom surface that would mandate a reduced grade for the paw.

Certain methods have been used to prevent the burns from occurring, including treating the chicken houses with ammonium bisulfate or dilute phosphoric acid in order to reduce the corrosive nature of the ammonia present. Bacterial treatment of the ammonia has also been used. These methods are all preventative in nature and are only partially effective in preventing lesion formation. There are also cost chemical safety issues with such treatments.

It has also been proposed to remove lesions from the paws in an attempt to improve grading. This removal can be done manually. However, there are drawbacks to manual removal. First, manual removal is labor intensive and time consuming, therefore expensive. Also, it is difficult to fully remove a lesion by hand with a sharp object without otherwise damaging the paw, leading to grade below A-grade.

Removal has also been proposed via mechanically driven brush-type or rubber finger contact based systems, which essentially scrape the paw surfaces in an attempt to remove the lesions. However, these systems are also destructive to the paws, again often leading to a grade below A-grade.

Accordingly, a device, system and method that can remove lesions from chicken paws while addressing one or more drawbacks of discussed above or others would be welcome.

BRIEF DESCRIPTION OF THE INVENTION

Aspects and advantages of the invention will be set forth in part in the following description, or may be obvious from the description, or may be learned through practice of the invention.

According to certain aspects of the disclosure, a device is disclosed for removing lesion material from poultry feet including a frame defining an input zone, a cleaning zone, and an output zone. A conveyor moves poultry feet sequentially through the input zone, the cleaning zone, and the output zone, the conveyor configured for holding the poultry feet in a cleaning position. At least one spray head is located in the cleaning zone for spraying the poultry feet while held by the conveyor in the cleaning position to remove the lesion material. Various options and modifications are possible.

According to certain other aspects of the disclosure, a device is disclosed for removing lesion material from poultry feet including a frame defining an input zone, a cleaning zone, and an output zone. A conveyor moves poultry feet sequentially through the input zone, the cleaning zone, and the output zone at a speed in a range of about 3.0 to about 12.0 inches per second, the conveyor configured for holding the poultry feet in a cleaning position. At least one spray head is located in the cleaning zone below the conveyor for spraying the poultry feet while held by the conveyor in the cleaning position to remove the lesion material, the spray head pressure being in the range of about 1600 to about 3200 psi. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a chicken paw with a lesion;

FIG. 2 is a perspective view of a chicken paw after removal of the lesion;

DETAILED DESCRIPTION OF THE INVENTION

Figure 3:
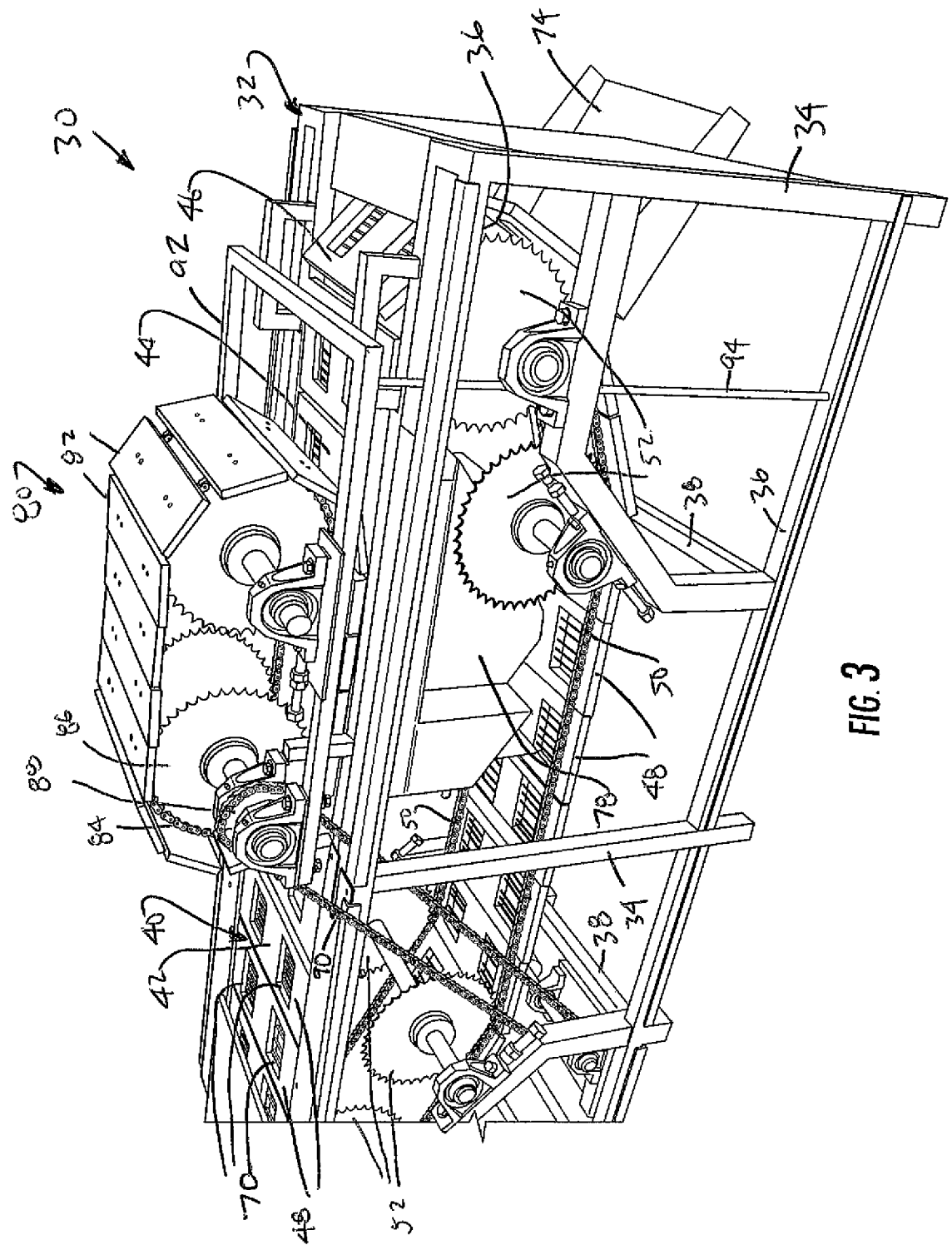
FIG. 3 is a perspective view of a portion of one example of a device for removing lesions from chicken paws.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As noted above, FIG. 1 shows a paw 20 with a lesion 22 thereon. FIG. 2 shows the paw 20 after removal of the lesion, for example by a device as described below. The assemblies of FIGS. 3-11 provide a spray head based system for substantially removing such lesions so as to achieve a paw as in FIG. 2, thereby being gradable higher than the paw as in the condition of FIG. 1.

As shown in FIGS. 3-8, a device 30 includes a frame 32 including a number of upright pieces 34, horizontal pieces 36 and cross pieces 38. It should be understood that frame 32 can have many different configurations. Frame 32 supports a conveyor 40 that is driven through an input zone 42, a cleaning zone 44 and an output zone 46 on an upper level. A lower level of conveyor returns from output zone 46 to input zone 42.

Figure 6:
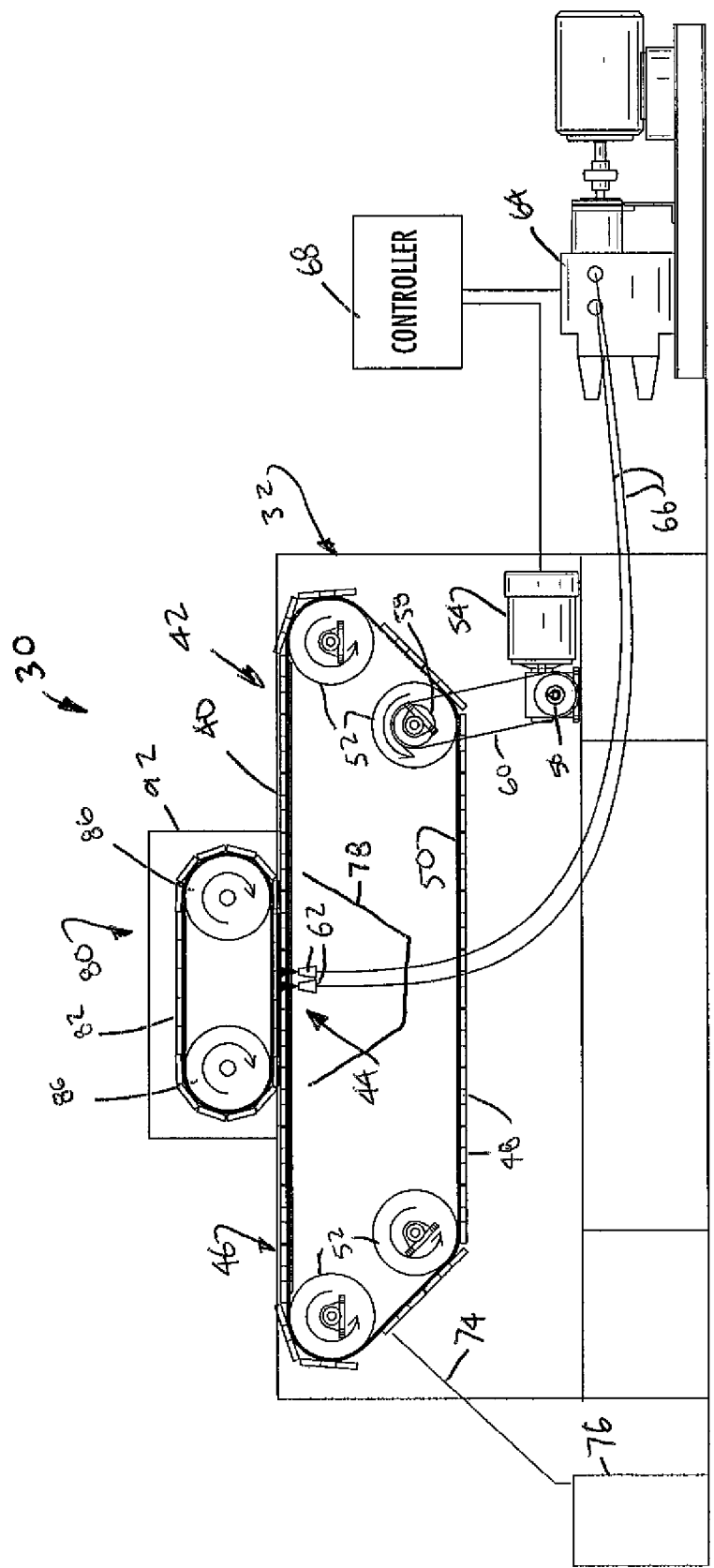
FIG. 6 is a schematic side view of a device as in FIG. 3 showing controls.
Figure 7:
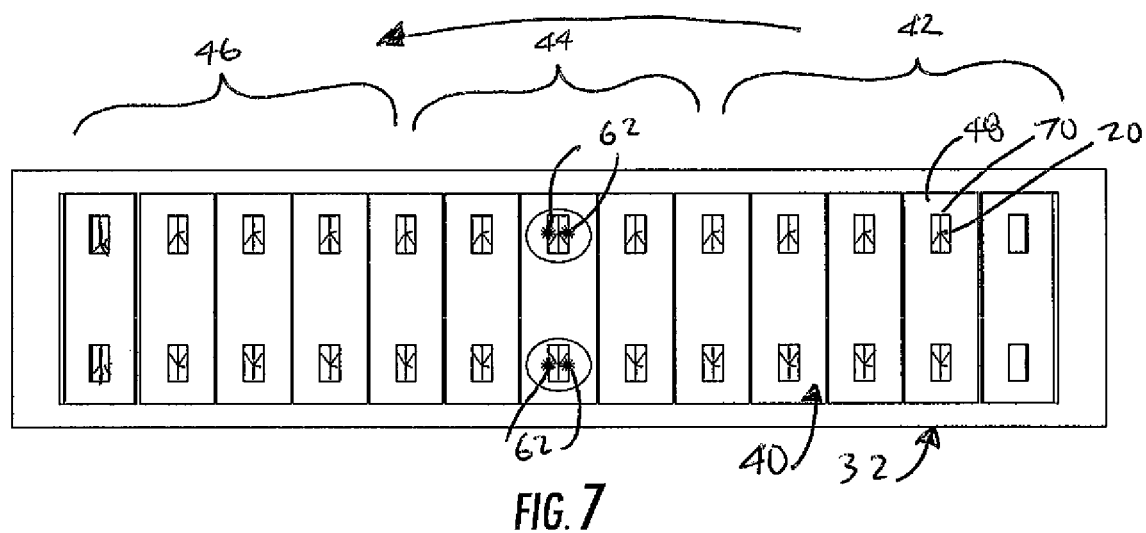
FIG. 7 is a schematic top view of a conveyor for a device as in FIG. 3.
Figure 8:
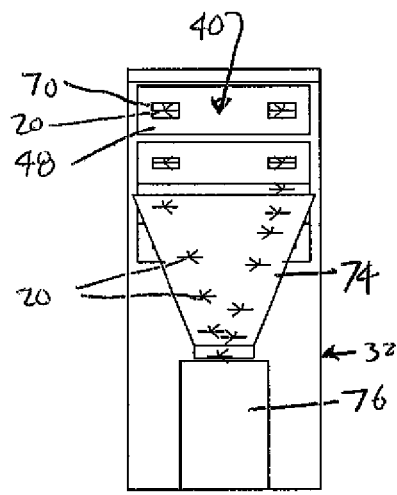
FIG. 8 is a schematic end view of the conveyor of FIG. 7.

Conveyor 40 includes a plurality of slats 48 driven by chains 50. Slats 48 can be joined to adjacent slats, via a hinge, etc., if desired, or simply connected by chains 50 and related structures. Chains 50 engage gears 52, at least one of which is driven via a motor 54. As shown in FIG. 6, output gearbox 56 of motor 54 drives input gear 58 of one of the main gears 52 via a chain 60. It should be understood that various alternate drive configurations are possible for conveyor 40. Also, conveyor can be made of alternate structures than slats 48, such as a web or belt, or other jointed conveyors of various types.

At least one spray head 62 is located in cleaning zone 44, as shown for spraying upward at a bottom side of conveyor slats 48 in that location. As shown in FIG. 6 two such heads 62 are shown. However it should be understood that additional heads could be provided depending on orientation, throughput, line speed, etc. Heads 62 are supplied by a pump 64 and hoses 66. A controller 68 controls operation of pump 64, motor 54, and any other electrically controlled elements. For example, controller 68 can include an input interface allowing a user to set a desired pressure and/or flow rate at heads 62 as dictated by pump 64, as well as a line speed for conveyor 40 as dictated by motor 54.

Slats 48 include openings 70 sized for receiving one or more paws 20. As shown, each opening is sized substantially so as to receive a single paw 20, with supports 72 such as thin rods placed across an inner end of openings 70 to hold the feet. It should be understood that opening 70 may be differently sized, and supports 72 may be differently constructed. Also, each slat 48 is shown as having two openings 70 (see FIGS. 3 and 7), although one or more than two openings could be used. The slats could be replaced by perforated steel pieces, allowing paws to be placed in any desired position.

Paws 20 may be placed by hand in openings 70 in the input zone 42 with any lesions facing downward. When conveyor 40 is driven, the placed paws 20 are then driven through the cleaning zone 44 and hit by spray from spray heads 62, and then to the output zone 46. The paws may be manually removed or simply dumped off the end of conveyor, for example onto a chute 74 for collection in a container 76. Lesions, any other materials removed during spraying, and sprayed water falls into a container such as 78 within conveyor, which can be connected to a drain, filter and solid material collection receptacle if desired.

Spray heads 62 may be high pressure rotating straight stream nozzles driven at a pressure of between 1600 and 3200 psi, rated for a flow rate of 2.0-3.6 gpm. Suitable spray heads would include Model 22357 Turbo Nozzles, made by General Pump, although other spray heads could be used. Heads 62 may be located for example 1.25 to 2.25 inches below the paws. Conveyor 40 may be driven at approximately 3.0 to 12.0 inches per second. Depending on the number and spacing of heads 62, a paw 20 will accordingly be sprayed for a given amount of time. It is believed that a spraying for about 0.5 to 1.5 seconds is sufficient to remove lesions at such line speeds and pressures. It is important that the parameters chosen substantially remove the lesions, at least from a substantial number of the paws so as to improve grading, without damaging or destroying the paws so as to cause a lowed grading. It is believed that a number of line speeds and head configurations and pressures could be employed to achieve satisfactory results.

Figure 4:
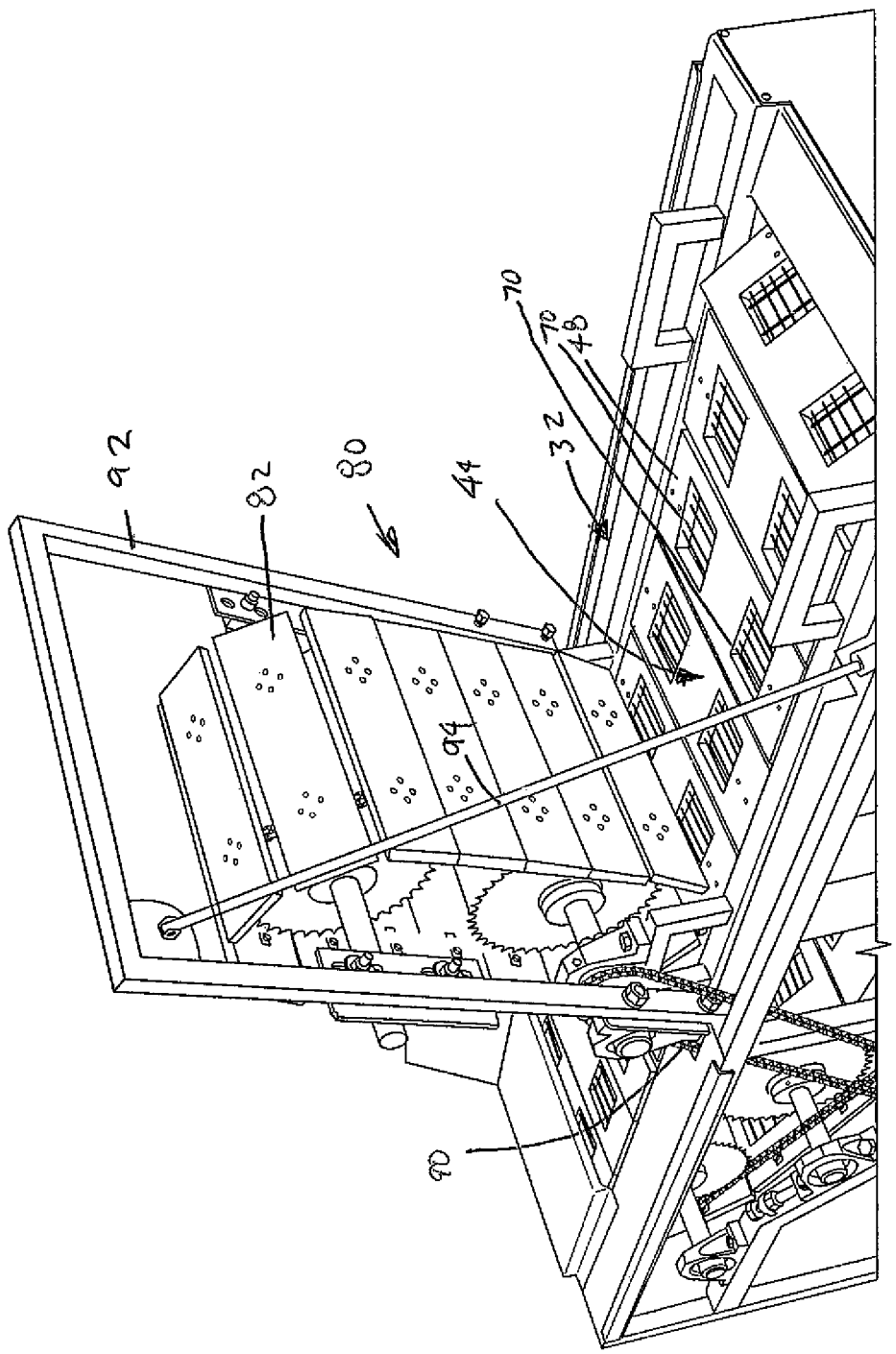
FIG. 4 is a perspective view of a portion of the device of FIG. 3, with a containment conveyor in a lifted position.
Figure 5:
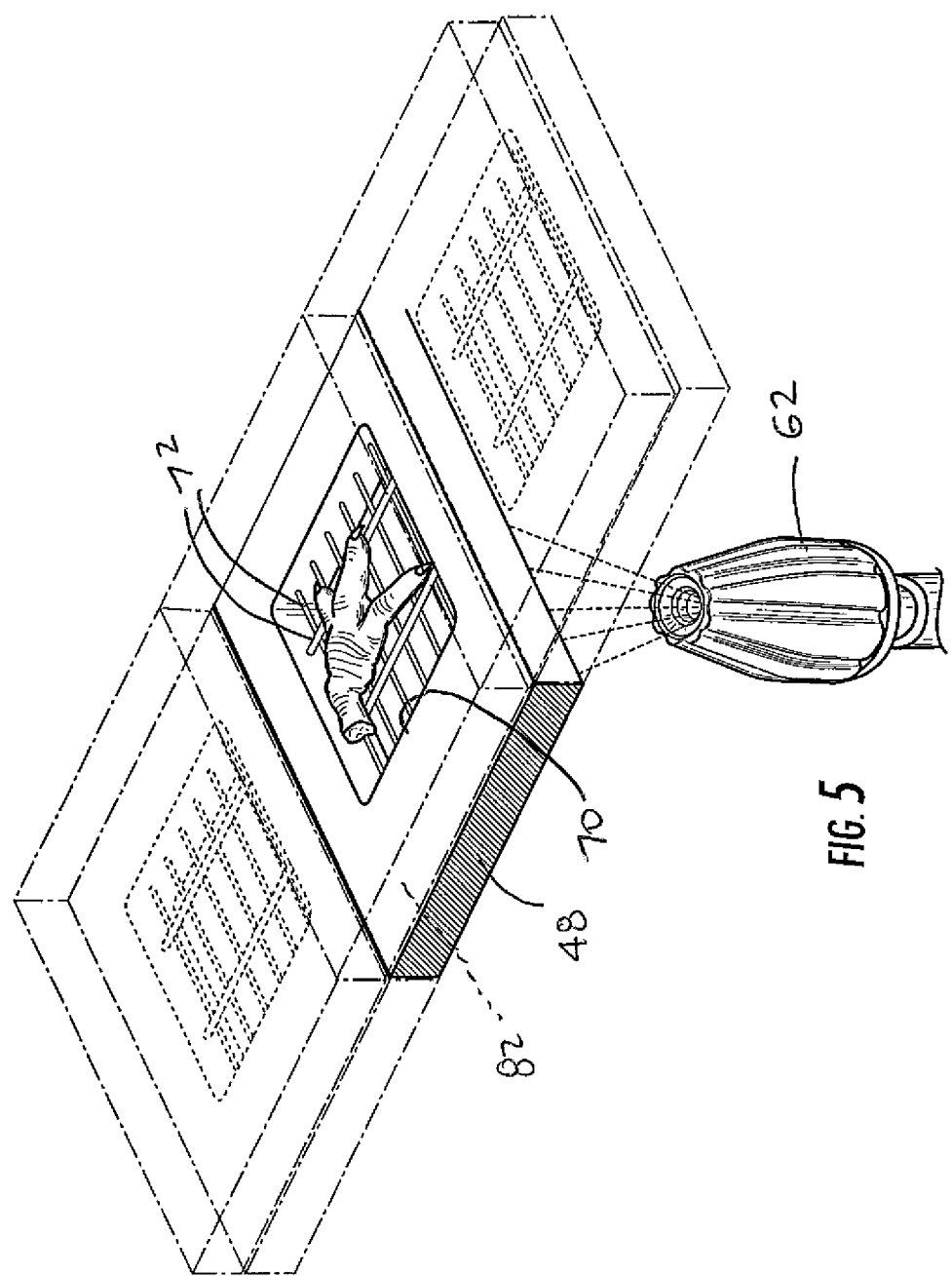
FIG. 5 is a perspective view of a spray head and a chicken paw in a spray zone of a device as in FIG. 3.

If desired, various structures can be used to hold paws in place during spraying. As shown in FIGS. 3,4 and 6, a containment conveyor 80 may be driven atop conveyor 40 at least over cleaning zone 44. Containment conveyor 80 may include slats 82, or it may also include a web, belt, or other structure. Containment conveyor 80 is driven atop conveyor 40 at a similar or identical speed as conveyor 40 to prevent paws 20 from being dislodged from conveyor 40 by the spraying of heads 62 and to keep water and any removed materials from spraying out. Conveyor 80 can be driven by attached chains 84 and gears 86, which are in turn driven by gear 88 and chain 90 rotatably driven by a motor such as motor 54 or a dedicated motor. If desired, conveyor 80 can be pivotably mounted to frame 32 via a subframe 92 so that it can be lifted for maintenance, cleaning or access to cleaning zone 44 as shown in FIG. 4. A prop rod 94 may be provided to hold frame 92 in the position of FIG. 4, if desired.

Also, if desired, the height of conveyor 80 may be adjustable relative to conveyor 40. Such adjustability could be useful if differently sized paws are to be run through the device and accordingly more spaced is desired. Such adjustment could be achieved by making upper frame 92 adjustable to main frame 32, or making components of conveyor 80 or its drive elements adjustable relative to frame 92.

Figure 9:
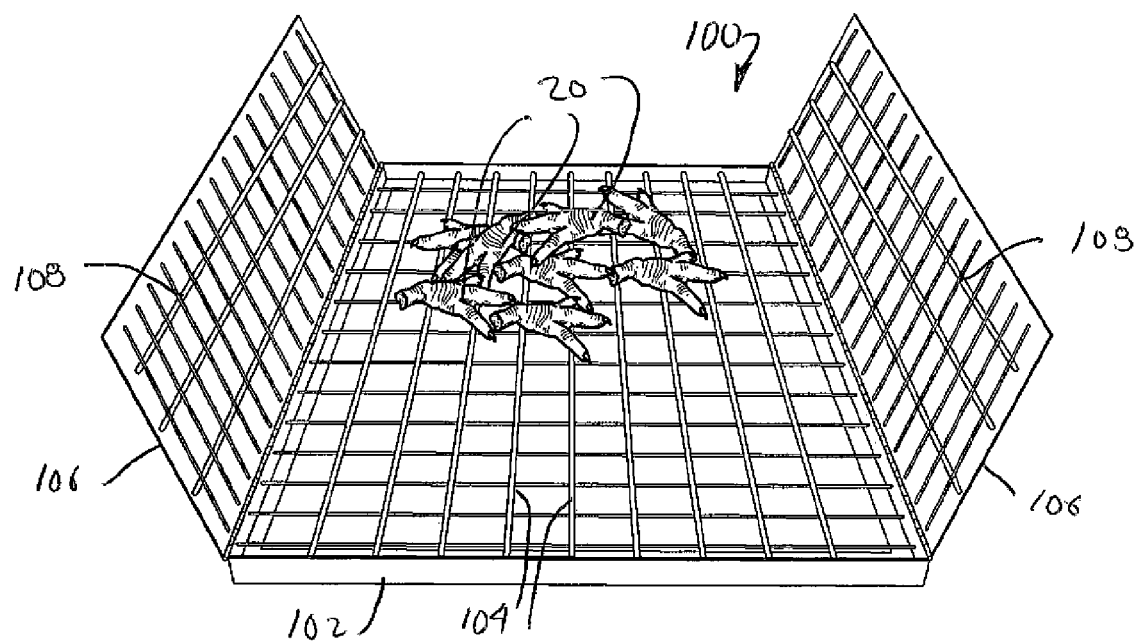
FIG. 9 is a perspective view of a tray used in a modified device without a containment conveyor.
Figure 10:
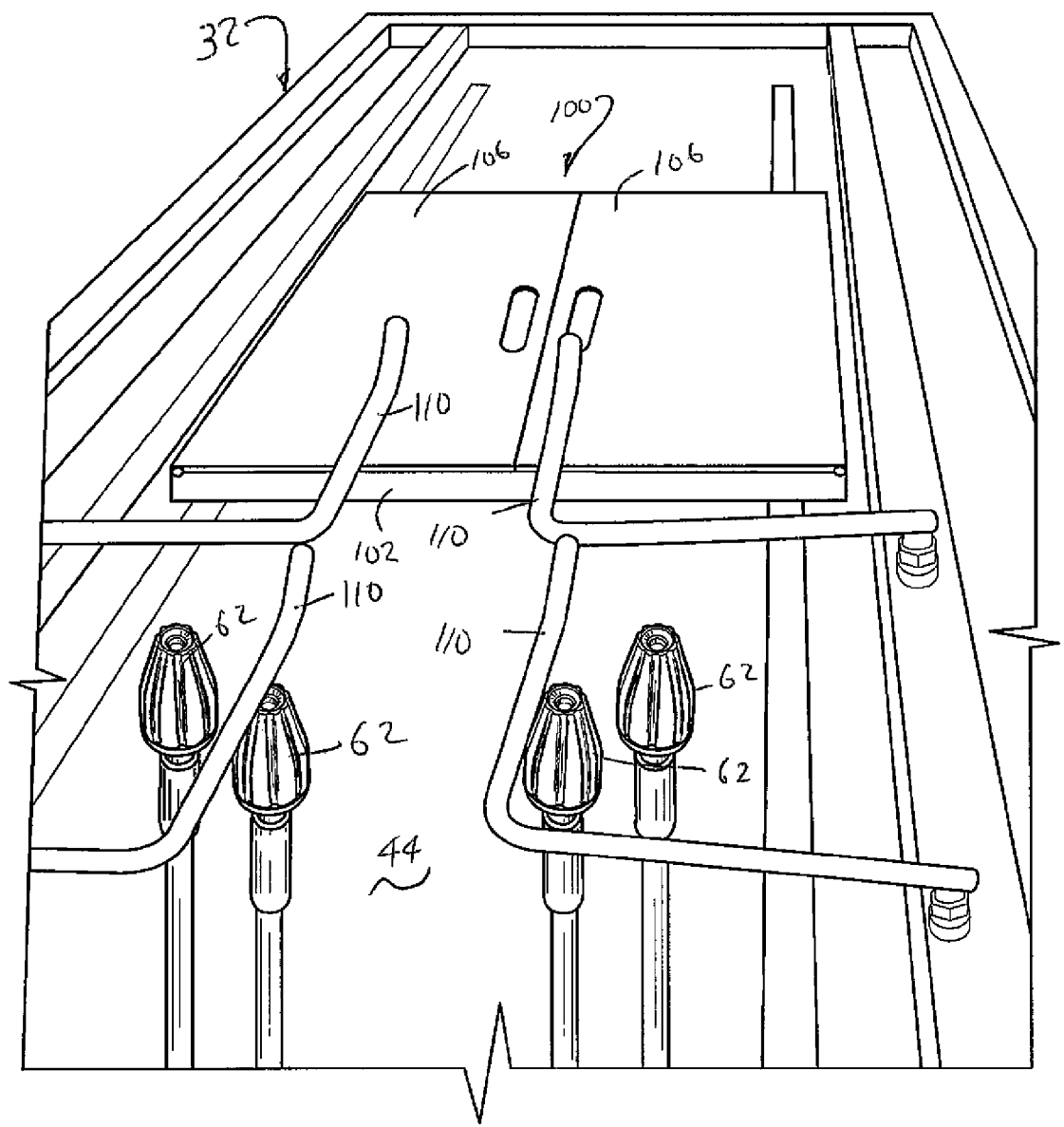
FIG. 10 is a perspective view of a portion of a spray zone with a tray as in FIG. 9 in the modified device.
Figure 11:
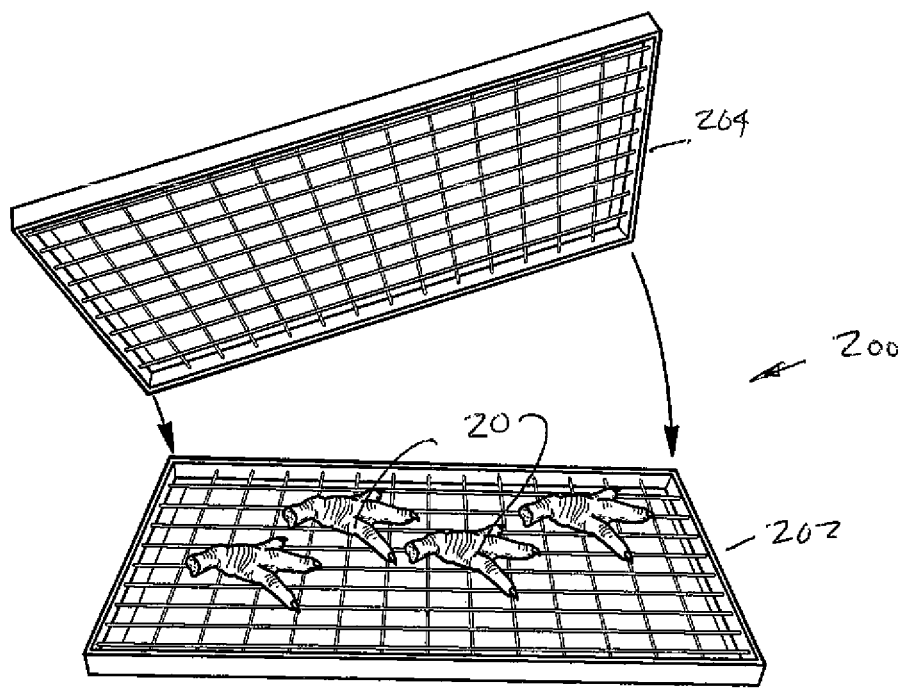
FIG. 11 is a perspective view of an alternate tray to that shown in FIG. 9 used in a modified device without a containment conveyor.

Accordingly, paws can be placed in openings 70 on conveyor 40 in input zone 42, driven through cleaning zone 44 under conveyor 80 for spraying by heads 62 and then into output zone 46. Lesions and other materials removed from paws and water will fall into container 78. Paws will travel out from under conveyor 80 and can be removed or dropped into container 76. A substantial number of paws will be able to obtain a higher grading as lesions will be substantially removed without causing great damage to the paws. The value of the paws as a whole would thus be greater after processing by device 30 than before. The paws can thus be further cleaned, sorted and packed for shipping as is conventional, and any waste from container 78 can be disposed of FIGS. 9 and 10 show a modified portion of device 30 wherein a conveyor 40 and a containment conveyor 80 are not required. A tray 100 can instead be provided having a base 102 open across its bottom and spanned by a support 104, such as a grid of rods. Multiple paws 20 can be placed on base. A top formed in two hinged plate sections 106 is provided for covering the paws once placed on base 102. As shown, a structure 108 such as grid is provided for holding the paws in position during spraying. FIG. 9 shows a few paws only, but the entire surface of base 102 can be covered with paws. Tray 100 is driven through the cleaning zone 44 for example by a chain, etc. attached to a motor such as motor 54. Cleaning zone 44 is modified with guide bars such as retainers 110 rather than a conveyor 80 for holding trays 100 down during spraying and/or holding tops 106 down on bases 102 during spraying. FIG. 11 shows a modified version of tray 100, wherein tray 200 includes separable bottom 202 and top 204 portions, rather than hinged portions.

Using such a tray 100,200, the paws can be placed in advance in the tray in large groups ahead of time rather than placed one or two at a time directly on a conveyor while in operation. Trays 100,200 can be manually unloaded as well, which can be done remotely from the device 30. It may be desirable in certain situations to employ such methods of filling and emptying trays in view of the greater number of paws that can be cleaned at once, labor usage, space available in processing plants, etc.

In view of the above, various options for a device for removing material from poultry feet are disclosed. The designs are subject to modification and application across different models and using different options. For example, it should be understood that the present device could be employed as a standalone device, loaded by hand. Instead, the device could be used within a processing line, using an automatic paw loading machine. Any number of heads could be used beneath conveyor 40. For example, four such heads may provide an optimal balance of throughput and water usage, although other arrangements are possible. Further, multiple devices can be arranged together, for example side by side, in a processing facility if desired to increase throughput. Also, the present device could be modified so as to be attachable or includable as part of another processing machine, as opposed to be a standalone assembly. Therefore, any and all such modifications and options should be understood as being within the scope of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A device for removing lesion material from poultry feet comprising:
   a frame defining an input zone, a cleaning zone, and an output zone;
   a conveyor for moving poultry feet sequentially through the input zone, the cleaning zone, and the output zone, the conveyor configured for holding the poultry feet in a cleaning position; and
   at least one rotary spray head located in the cleaning zone for spraying the poultry feet while held by the conveyor in the cleaning position to remove the lesion material, the spray head having a spray head pressure in the range of about 1600 psi to about 3200 psi.

2. The device of claim 1, further including a controller for controlling a speed of the conveyor and a pressure of the spray head.

3. The device of claim 2, wherein the conveyor speed is in the range of about 3.0 to about 12.0 inches per second.

4. The device of claim 1, wherein each poultry foot is sprayed by the spray head for about 0.5 to about 1.5 seconds.

5. The device of claim 1, wherein the cleaning zone includes a plurality of the spray heads.

6. The device of claim 1, wherein the conveyor includes a number of openings for receiving the poultry feet from above, whereby the spray head can spray the poultry feet from below.

7. The device of claim 6, wherein the openings are arranged in at least two lines in the conveyor.

8. The device of claim 1, further including a rack for receiving the poultry feet, the rack placeable on the conveyor in the input zone to move the poultry feet through the cleaning zone to be cleaned and then to the output zone.

9. The device of claim 8, wherein the rack has a top surface for holding the poultry feet in place while being sprayed from below during spraying.

10. The device of claim 1, further including a drain in the cleaning zone for draining fluid from the spray heads and for draining the material removed from the poultry feet.

11. A device for removing lesion material from poultry feet comprising:
    a frame defining an input zone, a cleaning zone, and an output zone;
    a conveyor for moving poultry feet sequentially through the input zone, the cleaning zone, and the output zone, the conveyor configured for holding the poultry feet in a cleaning position;
    at least one spray head located in the cleaning zone for spraying the poultry feet while held by the conveyor in the cleaning position to remove the lesion material; and
    a containment conveyor atop the cleaning zone, the containment conveyor having a surface that holds poultry feet in place on the conveyor during spraying.

12. The device of claim 11, wherein the containment conveyor is configured to be pivoted upward at one end to expose the conveyor in the cleaning zone.

13. A device for removing lesion material from poultry feet comprising:
    a frame defining an input zone, a cleaning zone, and an output zone;
    a conveyor for moving poultry feet sequentially through the input zone, the cleaning zone, and the output zone at a speed in a range of about 3.0 to about 12.0 inches per second, the conveyor configured for holding the poultry feet in a cleaning position; and
    at least one spray head located in the cleaning zone below the conveyor for spraying the poultry feet while held by the conveyor in the cleaning position to remove the lesion material, the spray head pressure being in the range of about 1600 to about 3200 psi.

14. The device of claim 13, further including a containment conveyor atop the cleaning zone, the containment conveyor having a surface that holds poultry feet in place on the conveyor during spraying.

15. The device of claim 14, wherein the containment conveyor is configured to be pivoted upward at one end to expose the conveyor in the cleaning zone.

16. The device of claim 13, further including a rack for receiving the poultry feet, the rack placeable on the conveyor in the input zone to move the poultry feet through the cleaning zone to be cleaned and then to the output zone.

17. The device of claim 16, wherein the rack has a top surface for holding the poultry feet in place while being sprayed from below during spraying.

* * * * *